United States Patent
Rao et al.

(10) Patent No.: US 12,467,059 B2
(45) Date of Patent: Nov. 11, 2025

(54) RICE WHITE LEAF AND PANICLE GENE WLP3 AND APPLICATION THEREOF IN RICE STRESS RESISTANCE AND YIELD INCREASE

(71) Applicant: Zhejiang Normal University, Jinhua (CN)

(72) Inventors: Yuchun Rao, Jinhua (CN); Tao Lu, Jinhua (CN); Jiahui Huang, Jinhua (CN); Wenjing Yin, Jinhua (CN); Qianqian Zhong, Jinhua (CN); Yuqi Yang, Jinhua (CN); Tianqi Lu, Jinhua (CN); Jinglei Sun, Jinhua (CN); Qiwei Jia, Jinhua (CN)

(73) Assignee: Zhejiang Normal University, Jinhua (CN)

( * ) Notice: Subject to any disclaimer, the term of this patent is extended or adjusted under 35 U.S.C. 154(b) by 0 days.

(21) Appl. No.: 18/331,970

(22) Filed: Jun. 9, 2023

(65) Prior Publication Data
US 2024/0175043 A1     May 30, 2024

Related U.S. Application Data

(63) Continuation of application No. PCT/CN2023/086900, filed on Apr. 7, 2023.

(30) Foreign Application Priority Data

Nov. 25, 2022 (CN) .......................... 202211494431.9

(51) Int. Cl.
    *C12N 15/00*     (2006.01)
    *C07K 14/415*     (2006.01)
    *C12N 15/82*     (2006.01)

(52) U.S. Cl.
    CPC ........ *C12N 15/8273* (2013.01); *C07K 14/415* (2013.01); *C12N 15/8262* (2013.01); *C12N 15/8269* (2013.01)

(58) Field of Classification Search
None
See application file for complete search history.

(56) References Cited

U.S. PATENT DOCUMENTS

2004/0123343 A1*   6/2004   La Rosa .............. C07K 14/415
                                                                     800/278

OTHER PUBLICATIONS

Alam et. al., Overexpression of a rice heme activator protein gene (OsHAP2E) confers resistance to pathogens, salinity and drought, and increases photosynthesis and tiller number, Plant Biotechnology Journal, 2015, 13:85-96 (Year: 2015).*
Chen et. al., The nuclear-encoded plastid ribosomal protein L18s are essential for plant development, 2022, Front. Plant Sci. 13: 949897 (Year: 2022).*
Gao et. al., Disruption of Photomorphogenesis Leads to Abnormal Chloroplast Development and Leaf Variegation in Camellia sinensis, 2021, Front. Plant Sci. 12:720800. (Year: 2021).*
Jiang et al., Transcriptomic analysis reveals mechanism of light-sensitive albinism in tea plant Camellia sinensis 'Huangjinju', 2020, BMC Plant Biology, 20:216 (Year: 2020).*
Lin et al., Dynamic Intra-Japonica Subspecies Variation and Resource Application, 2012, Molecular Plant, 5(1):218-230 (Year: 2012).*
McCallum et. al., Targeted screening for induced mutations, 2000, Nature Biotech., 18:455-457 (Year: 2000).*
Zhang et. al., Isolation and Analysis of Cold Stress Inducible Genes in *Zea mays* by Suppression Subtractive Hybridization and cDNA Macroarray, 2009, Plant Mol Biol Rep, 27:38-49 (Year: 2009).*
Yan et. al., Fine mapping of a candidate gene for cooltemperature-induced albinism in ornamental kale, 2020, BMC Plant Biology, 20:460 (Year: 2020).*
Zhu et. al., CRISPR/Cas9-mediated saturated mutagenesis of the cotton MIR482 family for dissecting the functionality of individual members in disease response, 2022, Plant Direct, 6:e410 (Year: 2022).*
Song et. al., The rice nuclear gene WLP1 encoding a chloroplast ribosome L13 protein is needed for chloroplast development in rice grown under low temperature conditions, 2014, Plant Mol Biol, 84:301-314 (Year: 2014).*
GenBank Accession No. NP_001389241 (Year: 2025).*
GenBank Accession No. XP_015630413.1 (Year: 2018).*

* cited by examiner

*Primary Examiner* — Amjad Abraham
*Assistant Examiner* — Jay Chatterjee
(74) *Attorney, Agent, or Firm* — Bayramoglu Law Offices LLC

(57) ABSTRACT

A rice white leaf and panicle gene wlp3 is provided. The cDNA sequence of the white leaf and panicle gene wlp3 is shown in SEQ ID NO: 1, and the encoded amino acid sequence of the protein is shown in SEQ ID NO: 2. The rice white leaf and panicle gene wlp3 is applied to rice stress resistance and yield increase. The white leaf and panicle gene wlp3 is configured to improve cold tolerance of plants, enhance photosynthetic rate, increase plant height, leaf albinism at seedling stage, panicle albinism at heading stage, and increase panicle length at low temperature. The present disclosure obtains the rice white leaf and panicle gene wlp3 through screening and mutagenesis, which is related to the stress resistance and chlorophyll synthesis of rice. Therefore, the present disclosure provides a foundation for rice breeding.

1 Claim, 11 Drawing Sheets
Specification includes a Sequence Listing.

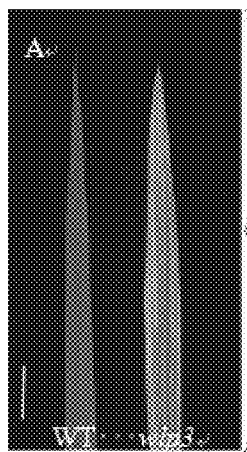 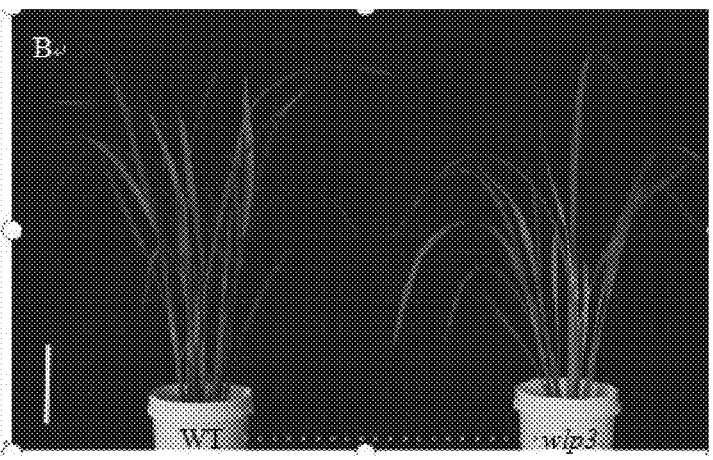
FIG. 1A  FIG. 1B
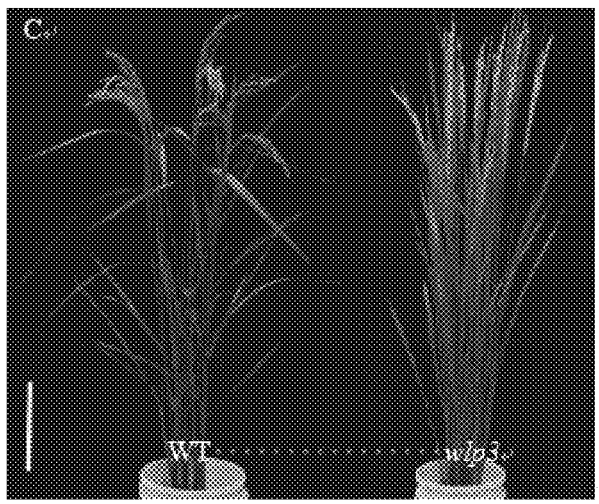 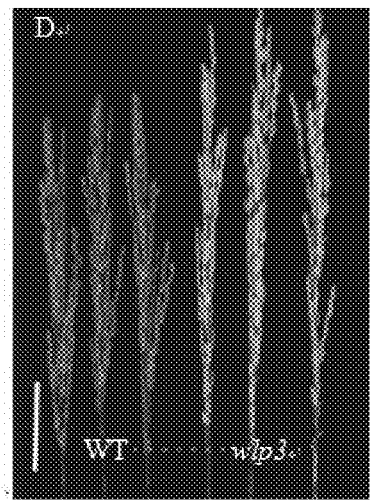
FIG. 1C  FIG. 1D

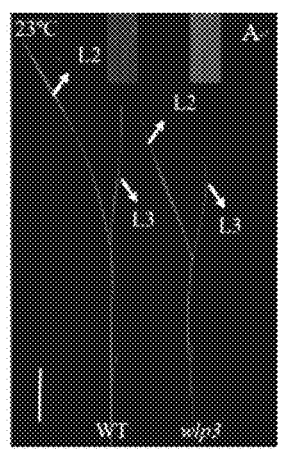 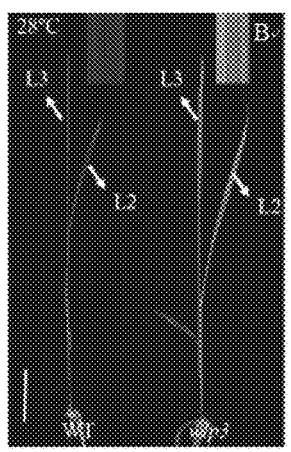 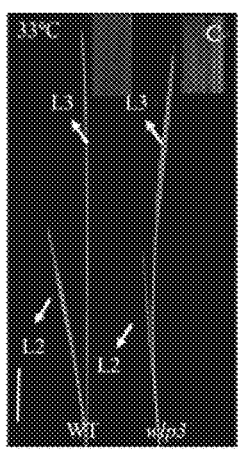
FIG. 2A  FIG. 2B  FIG. 2C
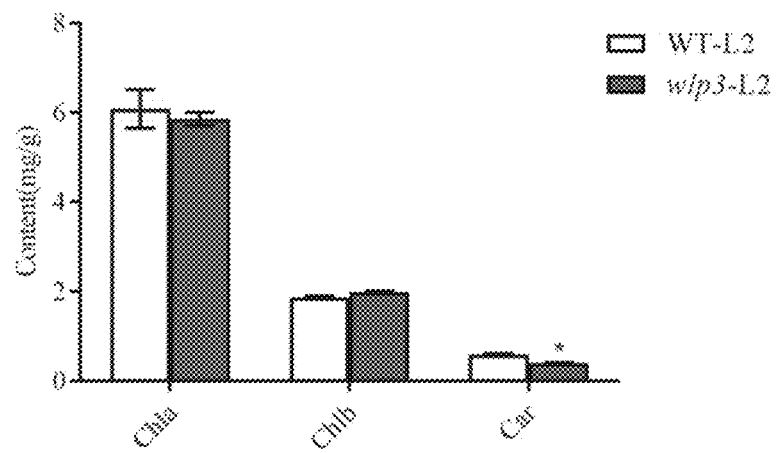
FIG. 2D
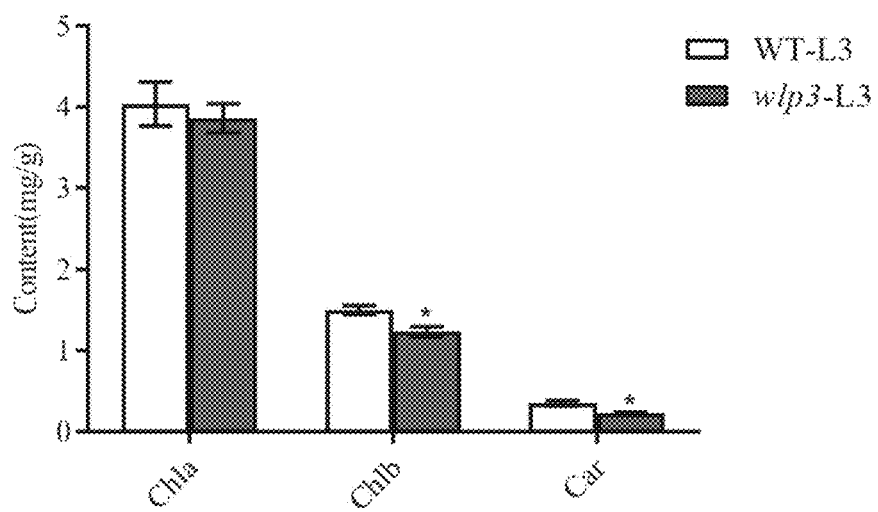
FIG. 2E

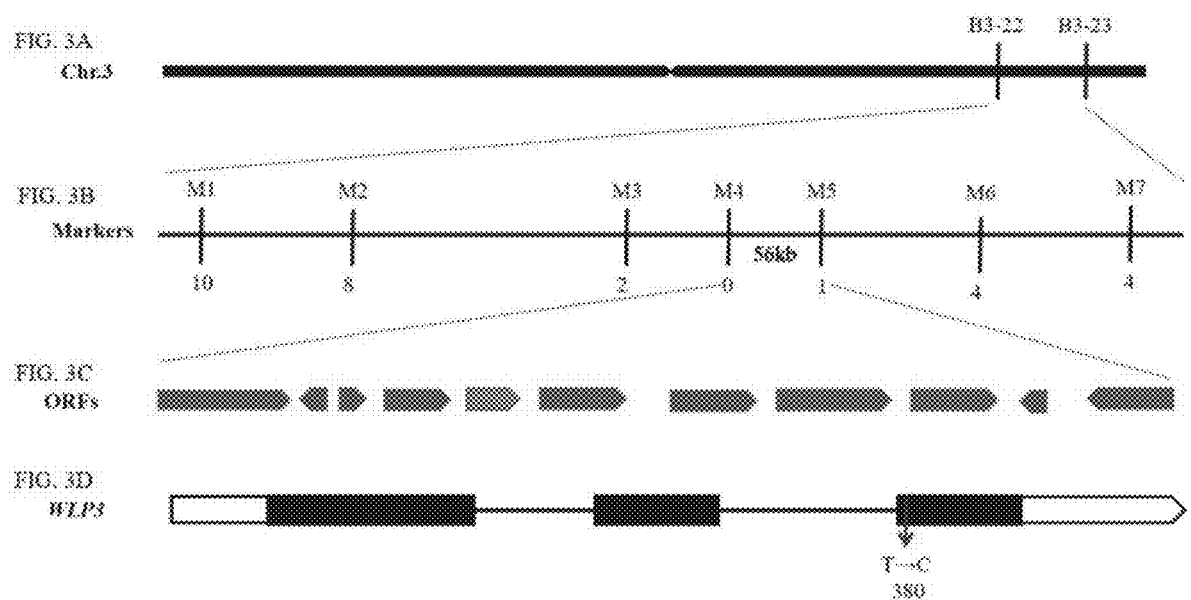

RICE WHITE LEAF AND PANICLE GENE *WLP3* AND APPLICATION THEREOF IN RICE STRESS RESISTANCE AND YIELD INCREASE

CROSS REFERENCE TO RELATED APPLICATION

This application is a continuation application of International Application No. PCT/CN2023/086900, filed on Apr. 7, 2023, which is based upon and claims priority to Chinese Patent Application No. 202211494431.9, filed on Nov. 25, 2022, the entire contents of which are incorporated herein by reference.

SEQUENCE LISTING

The instant application contains a Sequence Listing which has been submitted in XML format via EFS-Web and is hereby incorporated by reference in its entirety. Said XML copy is named GBSJBJ001_Sequence Listing_20240821.xml, created on Aug. 21, 2024, and is 103,901 bytes in size.

TECHNICAL FIELD

The present disclosure relates to the technical field of rice white leaf and panicle gene screening and breeding, and more specifically, to rice white leaf and panicle gene wlp3 and its application in rice breeding.

BACKGROUND

Chloroplasts in higher plants are about 6 μm long and 3 μm wide. Normal mesophyll cells contain 100-150 chloroplasts, and the content of chloroplasts varies in different species and different parts. The morphological structure of chloroplast consists of three parts: chloroplast membrane, thylakoid and matrix. The chloroplast membrane is a double-layer membrane like the cell membrane. The outer membrane has good permeability, while the inner membrane has strong selectivity. Thylakoid is a flat small body formed by wrapping a single layer of membrane. There are many photosynthetic pigments and proteins involved in electron transport system on thylakoid membrane, such as cytochrome complex, plastoquinone, plastocyanin, ferredoxin, flavoprotein, etc., where water can be photolyzed to form H and $O_2$, and ADP can be converted to ATP to provide energy for the later dark reaction. Therefore, thylakoid membrane is also known as photosynthetic membrane. Many thylakoids stack together to form grana. The material between chloroplast membrane and thylakoid is the matrix, which is the site of carbon assimilation. It contains enzymes chloroplast DNA after carbon assimilation, protein starch and other substances. Its main function is to fix $CO_2$ in organic matter, and use ATP to reduce triose, which provides sufficient raw materials for the synthesis of photoreactive substances.

As an important organelle in rice leaves, chloroplasts play an important role in the growth and development of rice. Chloroplasts can absorb and convert light energy into chemical energy that plants can utilize for storage, and their conversion efficiency directly determines the final yield and quality of rice. Chloroplast is a semi-autonomous organelle, which has its own genome, and the genome coordinates the development of plant chloroplasts with the nucleus. Chloroplasts are derived from the development of protoplasts, and their development is determined by external factors such as temperature and light, as well as internal factors such as hormone genes. Among these factors, the most important condition for chloroplast development is light. Only under sufficient light can the protoplasts develop into chloroplasts, while conversely, they will develop into etioplasts. The process of chloroplast development is mainly divided into three steps. The first step is the synthesis of the plastid's own genomic DNA and the replication of the plastid, but in this step, the transcription level of the plastid's own genes remains at a relatively low level. The second step is the establishment of chloroplast genetic system. At this time, nuclear encoded RNA polymerase (NEP) is first transcribed and expressed, for example, RpoTP is largely expressed at this stage. Next, NEP is responsible for the housekeeper gene of chloroplast development and plastid encoded RNA polymerase (PEP), and plastid transcriptional activity will increase. The third step is the increase of the expression of genes encoding photosystem-related genes, which are mainly transcribed by PEP expressed in the second stage, and two subunits encoding the photosystem system: psaA, psbA, and the two subunits of diphosphate carboxylase: rcL, rbcS, etc. are also included. As a model plant, rice is a good carrier for studying the chloroplast development of monocotyledonous plants. Current research suggests that the development of leaves will go through the stages of p0-p6, and each stage also has different gene specific expression. The transcription levels of POLP1 and FtsZ involved in DNA replication are very high in the stage of p0-p3, and gradually decline until almost zero at p4. At p4 stage, the expression levels of RpoTP, PEP subunits, and some ribosome proteins such as RPS7 and RPS15 gradually increase, while the expression levels of genes related to photosynthesis such as Lhcb, rbcs, and rbcl are the highest at p5 and p6.

Rice is the main food source for over half of the global population, and its yield plays a crucial role in human development. Leaves are the main site of photosynthesis, and their albinism can lead to a decrease in photosynthetic rate and ultimately lead to a decrease in rice yield. Therefore, exploring the mechanism of rice leaf albinism and studying the development process of chloroplasts has profound significance for understanding the molecular mechanisms of rice photosynthesis.

Therefore, screening a gene related to leaf and panicle albinism in rice and applying it to rice breeding is an urgent issue for technical personnel in this field.

SUMMARY

In view of the above, the present disclosure has screened a rice white leaf and panicle gene wlp3, which is related to the color of rice leaves. Further research on this gene has found that it can improve the cold tolerance ability of rice, increase yield, and lay the foundation for the breeding of excellent rice varieties.

In order to achieve the above purpose, technical solutions of the present disclosure are specifically described as follows.

Rice white leaf and panicle gene wlp3 is provided, and cDNA sequence of the white leaf and panicle gene wlp3 is shown in SEQ ID NO: 1.

The white leaf and panicle gene wlp3 is cloned by map-based cloning method. wlp3 gene is derived from a single base substitution of LOC_Os03g61620 gene, that is, nucleotide T at position 380 of SEQ ID NO: 3 is changed to C, which results in the conversion of amino acid 127 from isoleucine to threonine. Bioinformatics analysis revealed that wlp3 encodes the large ribosomal subunit L18, and the protein sequence encoded by the wild type wlp3 gene is shown in SEQ ID NO: 4.

As the same inventive concept as the above technical solution, the present disclosure also requests the protection of a protein encoded by the sequence shown in SEQ ID NO: 1, and the amino acid sequence of the protein is shown in SEQ ID NO: 2.

As the same inventive concept as the above technical solution, the present disclosure also requests the protection of an application of the rice white leaf and panicle gene wlp3 in rice stress resistance and yield increase, wherein the white leaf and panicle gene wlp3 can improve cold tolerance of plants, enhance photosynthetic rate, increase plant height, leaf albinism at seedling stage, panicle albinism at heading stage, and increase panicle length at low temperature.

Preferably, the white leaf and panicle gene wlp3 controls rice plants with alleviation of leaf albinism at low temperature and albinism at high temperature.

The rice white leaf and panicle gene wlp3 of the present disclosure is screened from the EMS mutagenesis library of the *japonica* rice variety Zhonghua 11. The mutant wlp3 shows a white stripe phenotype at the two-leaf stage and lasts until the tillering stage. White stripes are distributed in the whole leaf along the leaf vein. After the four-leaf stage, with the growth and development of rice, the newly grown leaves of wlp3 gradually turn green until they returned to the same phenotype as the wild type.

The rice white leaf and panicle mutant wlp3 gene of the disclosure can enhance the resistance of crops to adverse environments by genetic engineering or genetic engineering methods, such as improving the photosynthesis of crops to increase the yield.

In summary, in order to explore new leaf color related genes, the present disclosure screened a white leaf and panicle mutant from the EMS mutagenesis library of the *japonica* rice variety Zhonghua 11, and named it wlp3 (white leaf and panicle3). Phenotypic analysis and hormone response of wlp3 have broad application prospects in influencing rice leaf color.

BRIEF DESCRIPTION OF THE DRAWINGS

In order to explain the embodiments of the present disclosure or the technical solutions in the prior art more clearly, the following drawings that need to be used in the description of the embodiments or the prior art are briefly introduced. Obviously, the drawings in the following description are only embodiments of the present disclosure. For those of ordinary skill in the art, other drawings can be obtained based on the drawings disclosed without creative work.

FIGS. 1A-1D show the phenotypes of wild type Zhonghua 11 and mutant wlp3; (FIG. 1A) leaf phenotypes of wild type and wlp3 at seedling stage, with the scale of 1 cm; (FIG. 1B) phenotypes of wild type and wlp3 at tillering stage, with the scale of 10 cm; (FIG. 1C) phenotypes of wild type and wlp3 at mature stage, with the scale of 20 cm; (FIG. 1D) panicle phenotypes of wild type and wlp3, with the scale of 5 cm;

FIGS. 2A-2I show the leaf phenotypes of wild type and wlp3 at different temperatures, as well as the chlorophyll a (Chla), chlorophyll b (Chlb), and carotenoids (Car) content of the leaf 2 and leaf 3;

FIGS. 3A-3F show the localization map of the wlp3 gene; (FIG. 3A) initial localization of wlp3; (FIGS. 3B-3C) fine localization of WLP3; (FIG. 3D) the gene structure of wlp3; (FIG. 3E) mutation site of wlp3 shown in SEQ ID NO: 79; (FIG. 3F) mutations in the amino-acid sequence of wlp3 shown in SEQ ID NO: 80 and SEQ ID NO: 81;

(FIG. 4A) the phenotypes of wild type and wlp3 before cold treatment at 4° C., with the scale of 5 cm; (FIG. 4B) the expression levels of cold tolerance related genes in wild type and wlp3 before cold treatment at 4° C.; (FIG. 4C) the expression levels of cold tolerance related genes in wild type and wlp3 after cold treatment at 4° C.; (FIG. 4D) the phenotypes of wild type and wlp3 after cold treatment at 4° C., with the scale of 5 cm; (FIG. 4E) the chlorophyll a (Chla), chlorophyll b (Chlb), and carotenoids (Car) content of wild type and wlp3 after cold treatment at 4° C.;

(FIG. 5A) the expression levels of genes related to chlorophyll synthesis in wild type and wlp3; (FIG. 5B) the expression levels of genes related to ribosome in wild type and wlp3; (FIG. 5C) the expression levels of genes related to chloroplast development in wild type and wlp3;

DETAILED DESCRIPTION OF THE EMBODIMENTS

Figure 2F:
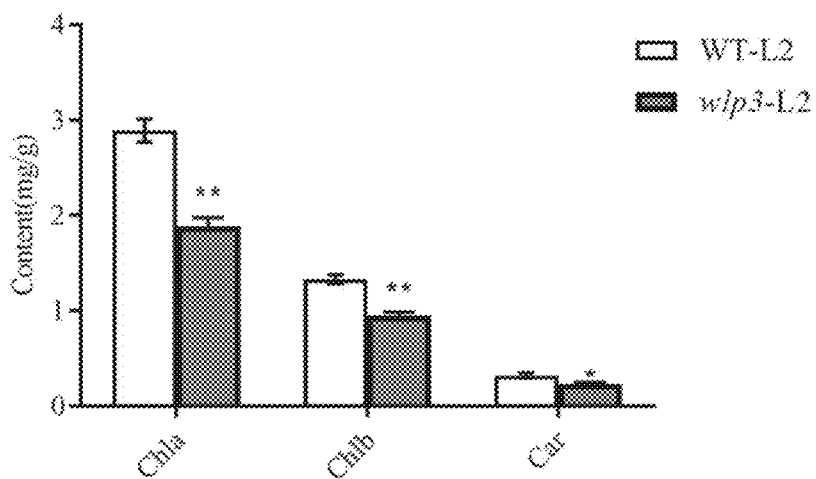
Figure 2G:
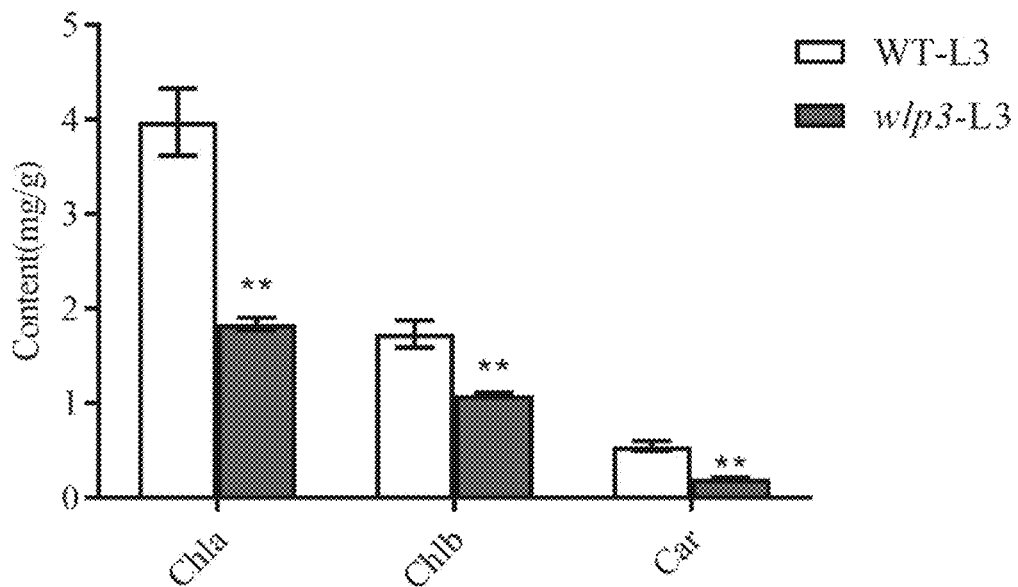
Figure 2H:
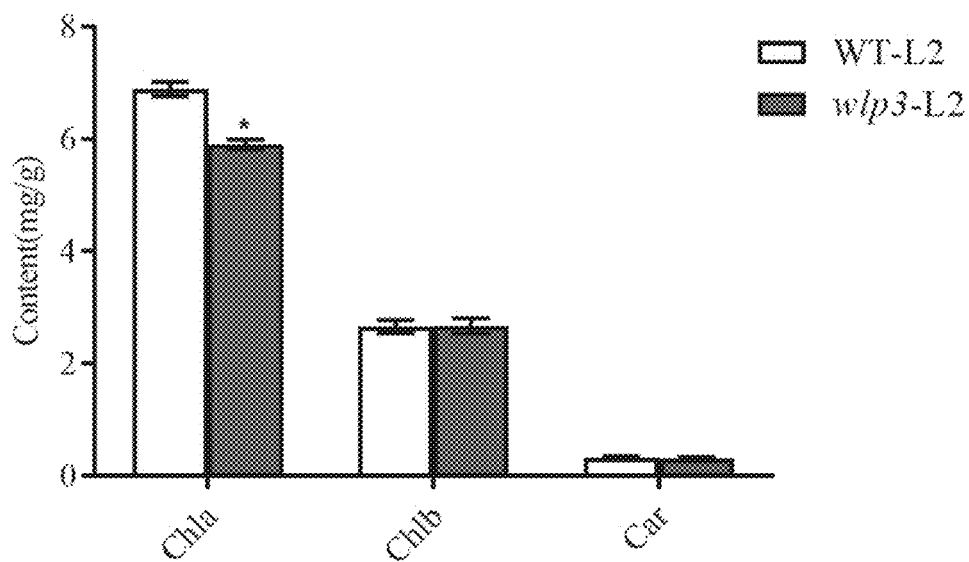
Figure 2I:
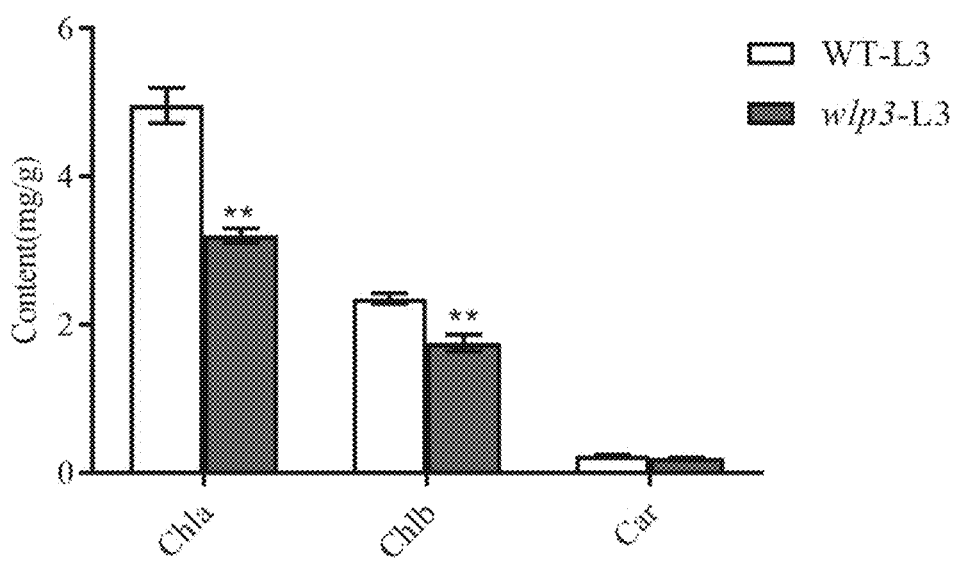
Figure 3E:
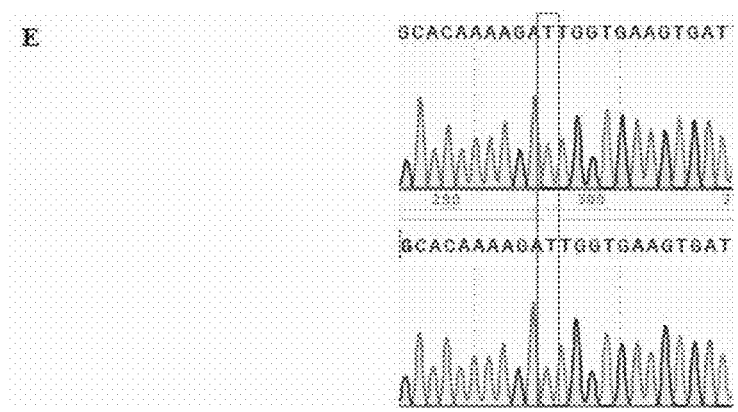
Figure 3F:
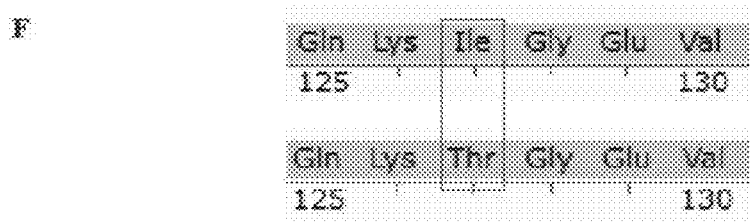
Figure 4A:
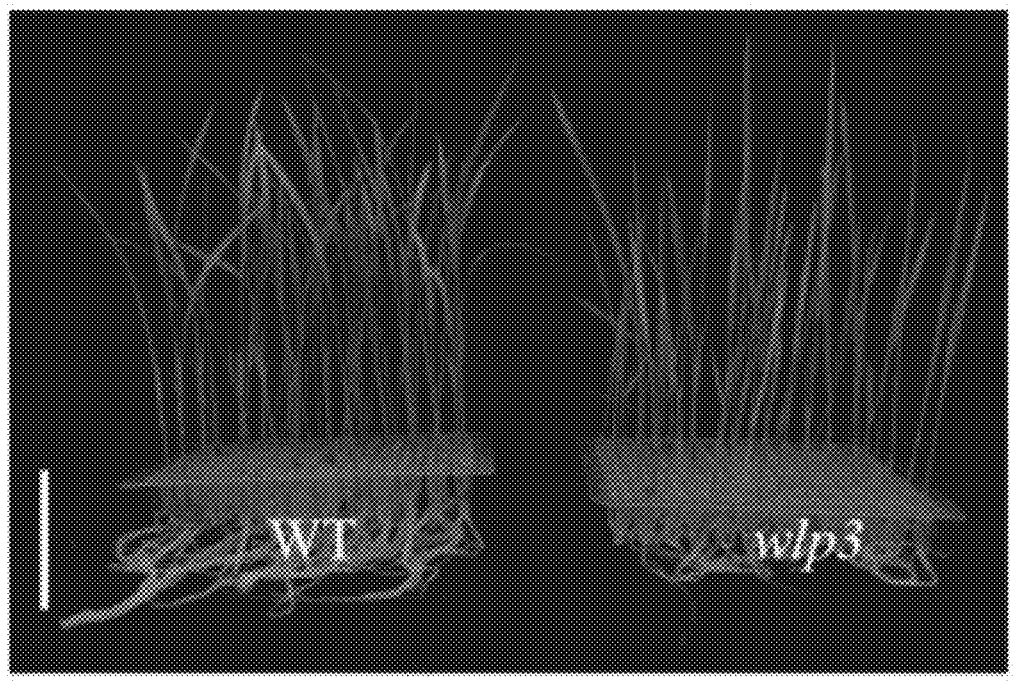
FIGS. 4A-4E show the response of wild type and wlp3 to cold stress.
Figure 4B:
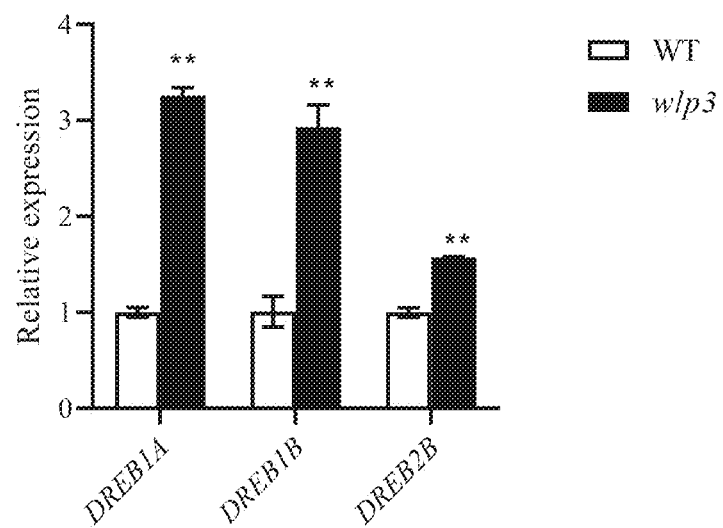
Figure 4C:
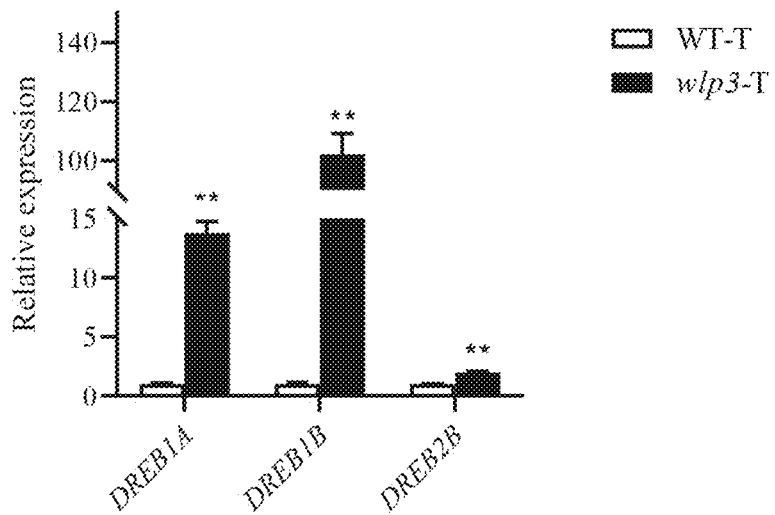
Figure 4D:
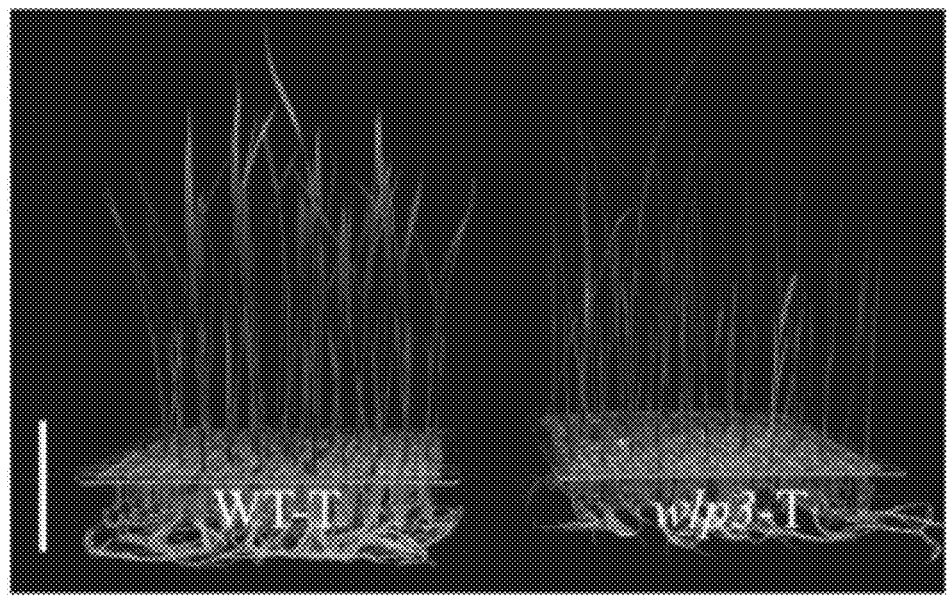
Figure 4E:
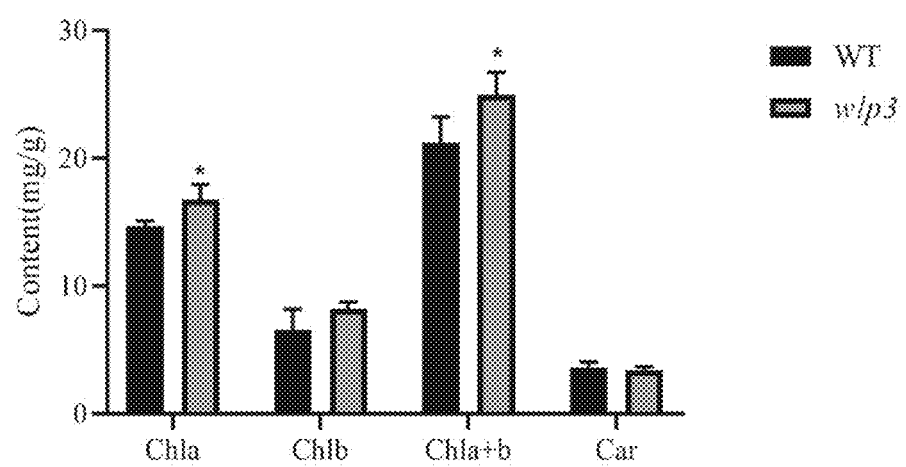

Technical solutions in the embodiments of the present disclosure will be clearly and completely described below with reference to the accompanying drawings in the embodiments. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Embodiment 1 Acquisition of Mutant Materials

*Japonica* rice variety Zhonghua 11 was chemically mutagenized by EMS, and the seeds were soaked in water for 8 h. The water was then drained and 1% EMS solution that has been prepared was poured in for soaking to induce mutagenesis for 8 hours. During this period, the mixture was stirred several times with a small wooden stick to ensure uniformity. After the mutagenesis is completed, the toxic EMS buffer solution was washed out with running water. After germination at 25° C., the seedlings were transplanted and harvested. The growth period was managed according to conventional field management. One copy of the white leaf and panicle mutant wlp3 was obtained by screening.

The traits of the mutant have been stably inherited through multiple generations of self-crossing, and all rice materials were planted in the experimental field of College of Biochemistry, Zhejiang Normal University, Jinhua City, Zhejiang Province, under routine management.

Embodiment 2 Phenotype Analysis of the Plants

Under field conditions, the mutant wlp3 showed a white stripe phenotype at the two-leaf stage and lasted until the tillering stage. White stripes were distributed in the whole leaf along the leaf vein. After the four-leaf stage, with the growth and development of rice, the newly grown leaves of wlp3 gradually turned green until they returned to the same phenotype as the wild type. During the growth process, the phenotype of wlp3 was basically the same as that of wild type, while the plant height was higher than that of wild type at mature stage. At the young panicle stage, the panicles of wlp3 showed albinism phenotype again and the panicle length was longer than that of wild type. (FIGS. 1A-1D)

Embodiment 3 Population Construction and Genetic Analysis

When the mutant wlp3 was subjected to reciprocal crosses with conventional indica rice 9311 and ZF802, the F1 plants showed normal wild type phenotype, indicating that wlp3 was controlled by recessive nuclear genes. The segregation ratio of F2 segregating population was counted (Table 1). The results showed that the segregation ratio of normal phenotype plants and mutant phenotype plants was close to 3:1 by chi-square test, which indicated that the white leaf and panicle phenotype of wlp3 was controlled by a pair of single recessive nuclear genes.

TABLE 1

Genetic analysis of white leaf and panicle mutant wlp3

| Cross combination (♀/♂) | F1 phenotype | F2 phenotype Green leaf and panicle | F2 phenotype White leaf and panicle | Total | $\chi^2$ (3:1) |
|---|---|---|---|---|---|
| wlp3/9311 | Normal phenotype | 332 | 115 | 447 | 0.12 |
| 9311/wlp3 |  | 386 | 138 | 524 | 0.498 |
| wlp3/ZF802 |  | 261 | 81 | 342 | 0.316 |
| ZF802/wlp3 |  | 189 | 60 | 249 | 0.108 |

Embodiment 4 Fine Mapping of Wlp3 Gene

Polymorphism screening was conducted on mutants and Zhonghua 11, 9311 by SSR primers uniformly distributed on 12 rice chromosomes preserved in our laboratory. Then, linkage analysis was conducted on 21 F$_2$ individuals with white leaves and panicles to preliminarily confirm the chromosomal location of the target gene. Genomic DNA was extracted by the CTAB method. The specific steps are as follows:

① 0.1 g of rice leaves was weighed and grind into powder with liquid nitrogen, then 600 μL of DNA extraction buffer prepared by CTAB solution (2% (m/V) CTAB, 100 mmol/L Tris-HCl, 20 mmol/L EDTA, 1.4 mol/L NaCl; pH8.0) was added and subjected to a water bath at 65° C. for 40 min. Then 600 μL of chloroform: isoamyl alcohol (volume ratio 24:1) was added and mixed well. Centrifugation was performed at 10,000 rpm for 5 min and the supernatant was transferred to a new centrifuge tube.

② ⅔-1 times the volume of pre-cooled (to 4° C.) isopropanol was added to the supernatant obtained after centrifugation in step ① above, and gently mixed until DNA precipitated. Centrifugation was performed at 13,000 rpm for 8 min and the supernatant was poured out.

③ The DNA precipitate obtained in step ② above was washed with 200 μL of 70% (volume concentration) ethanol.

④ The above washed DNA was dried and dissolved in 100 μL TE buffer or pure water.

⑤ The concentration of DNA sample obtained in step ④ above was detected by UV spectrophotometry, and the integrity of DNA was detected by 0.7% agarose gel electrophoresis. Complete and appropriate DNA was used for PCR amplification, and incomplete DNA was re-extracted until complete DNA was obtained.

The PCR reaction system was a 10 μL system: 1 μL of DNA template, 1 μL of 10×PCR buffer, 0.5 Ml of forward primers (10 μmol/L) and 0.5 Ml of reverse primers (10 μmol/L), 1 μL of dNTPs, 0.2 μL of rTaq enzyme, and ddH2O to make up 10 μL. The PCR amplification procedure was as follows: pre-denaturation at 94° C. for 4 min; denaturation at 94° C. for 30 s, annealing at 55° C.-60° C. for 30s (temperature varies with primers), extension at 72° C. for 30 s, 40 cycles; and finally, extension at 72° C. for 10 min.

PCR products were electrophoresed on a 4% agarose gel. After electrophoresis, the gel was photographed and read on a gel imager. Linkage analysis of the wlp3 gene using the 120 pairs of SSR primers screened above revealed that linkage was exhibited near the end of chromosome 3. New Indel markers were designed upstream and downstream of the linkage markers, and the 21 individual plants were used to lock the target gene interval between the molecular markers M1 and M6. New molecular markers were designed in this interval again, and 138 F$_2$ individual plants were used to finally map the gene in the interval between M1 and M2 of about 56 kb. Primer sequences are shown in Table 2.

TABLE 2

Molecular markers for fine mapping

| Primer name | Forward primer (5'-3') | Reverse primer (5'-3') | Purpose |
|---|---|---|---|
| B3-22 | GTTTTGTTCCTTTGTT TTCTC (SEQ ID NO: 5) | AATAGATGAAGGGAGTATC TCAT (SEQ ID NO: 6) |  |
| B3-23 | GAGTTACCTCCATCC TGTTGC (SEQ ID NO: 7) | AGAGTCTTGATCTCGTGCTT C (SEQ ID NO: 8) | Mapping |
| M1 | CCAGCCTAGTCAGAG GCAGA (SEQ ID NO: 9) | GGTGGTTTTGATCCTGGTTT T (SEQ ID NO: 10) |  |
| M2 | GAGCTGCCATGGTAG GATGT (SEQ ID NO: 11) | AACGGACAGCTCGTACATT TTT (SEQ ID NO: 12) |  |
| M3 | GTCTTCCGGTTAGCT CCACA (SEQ ID NO: 13) | TAATTCGCAGCCATTCAAC A (SEQ ID NO: 14) |  |
| M4 | CAATCGCCTCTACGT CCATT (SEQ ID NO: 15) | GCCGGGATGTTCTGGTAGTA (SEQ ID NO: 16) |  |
| M5 | GGATTGAAGCAGGTG TTCGT (SEQ ID NO: 17) | TGTAGTAGGTGGGGCCGTA G (SEQ ID NO: 18) |  |
| M6 | CAAGACTTGGCTGCG TTCTT (SEQ ID NO: 19) | CAGTCCGGAAGGAGTATAA CCA (SEQ ID NO: 20) |  |
| M7 | GACTTCAATGCGGAA ACCAT (SEQ ID NO: 21) | TTGCAGACTCAACCTACAC CA (SEQ ID NO: 22) |  |

TABLE 2-continued

Molecular markers for fine mapping

| Primer name | Forward primer (5'-3') | Reverse primer (5'-3') | Purpose |
|---|---|---|---|
| WLP3-1 | ATCTCCTCGTGGACATAGGC (SEQ ID NO: 23) | ATGCCACATGCATAAAACCA (SEQ ID NO: 24) | Sequencing |
| WLP 3-2 | CTGACGATCCTTTGCTGATG (SEQ ID NO: 25) | AAATGCTCCCAGCTTTTCCT (SEQ ID NO: 26) | |

According to the data information of rice genome database (rice.plantbiology.msu.edu), the accession number is LOC_Os03g61620, indicating that this gene is a candidate gene. Primers covering this gene region were used to amplify the DNA of wild type and mutant, respectively. Sequencing results showed that there was a T-to-C mutation in the third exon of WLP3 gene and the coding region 380, resulting in the protein changing from isoleucine to threonine (FIGS. 3A-3F).

The cDNA sequence of rice white leaf and panicle gene wlp3 is described in SEQ ID NO: 1, and the amino acid sequence is described in SEQ ID NO: 2.

The cDNA sequence of WLP3 in Zhonghua 11 is as described in SEQ ID NO: 3, and the amino acid sequence is as described in SEQ ID NO: 4.

The base substitution on the WLP3 gene obtained by the disclosure causes the phenotype of leaf albinism and panicle albinism of rice plants.

Embodiment 5 Wlp3 Response to Cold Stress

Low temperature stress: wild type and wlp3 plants at seedling stage were selected, transferred to the incubator at 4° C. and 28° C. respectively, and treated for 7 days under the same other culture conditions. Subsequently, the chlorophyll content of wild type and wlp3 at different temperatures was measured, and RNA was extracted to analyze the expression levels of genes related to cold stress.

The obtained results are shown in FIGS. 4A-4E. According to FIGS. 4A-4E, it can be seen that after cold treatment, the leaves of wild type turned yellow, while the leaves of wlp3 remained green. The expression levels of DREB1A, DREB1B and DREB2B genes related to cold tolerance were detected by qRT-PCR. It was found that the expression levels of these genes in wlp3 increased sharply after cold treatment, which indicated that the mutation of wlp3 would cause the improvement of plant cold tolerance.

Embodiment 6 Expression Analysis of Genes Related to Chloroplast Development

In order to analyze whether the mutant wlp3 affects the expression of genes related to chlorophyll synthesis and chloroplast development, the disclosure analyzed the expression of genes related to these pathways by qRT-PCR method.

Figure 5A:
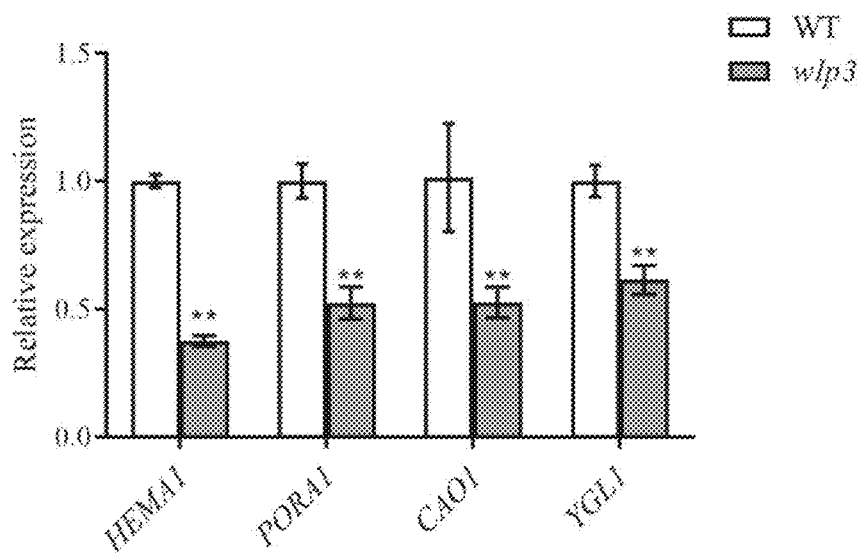
FIGS. 5A-5C show the analysis of expression levels of genes related to leaf color in wild type and wlp3.
Figure 5B:
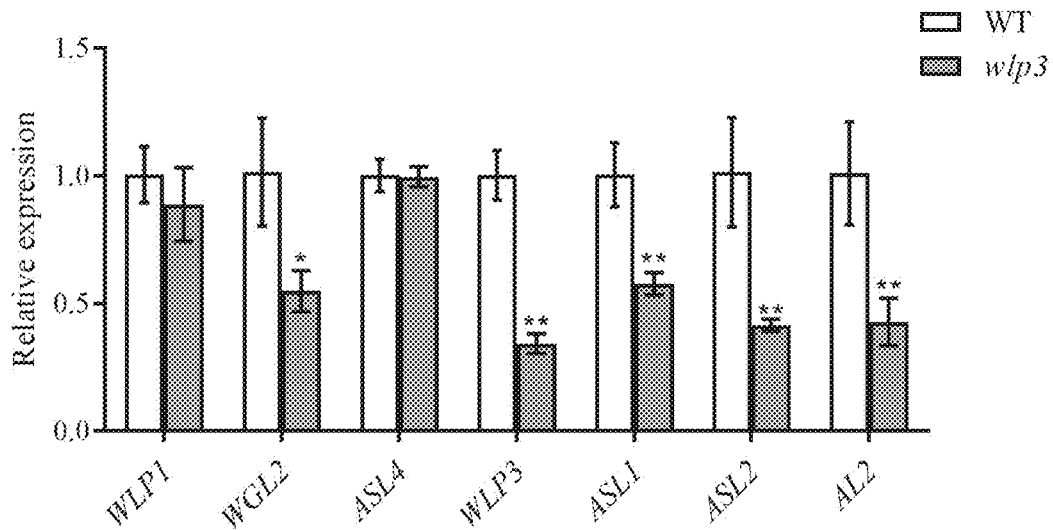
Figure 5C:
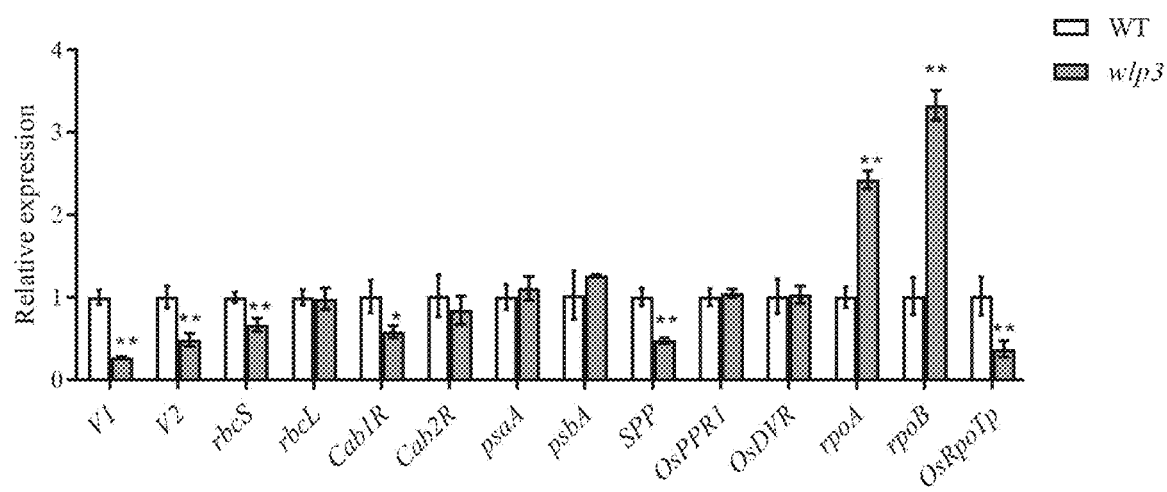

For RNA extraction, total RNA of mutant and wild type leaf samples at tillering stage was isolated according to the steps of total RNA extraction kit RNeasy Plant Mini Kit (QIAGEN), and then reversely transcribed into cDNA according to the instructions of reverse transcription kit ReverTra Ace® qPCR RT Kit (TOYOBO). The expression levels of each gene in wild type and mutant were analyzed through quantitative real-time PCR (qRT-PCR). The gene OsActin was used as the internal reference gene, and three parallel duplicate wells were made for each reaction. Relative quantitative analysis was performed through $2^{-\Delta\Delta Ct}$ method, and three independent reactions were repeated. The real-time PCR instrument was 7500 real-time PCR system (Applied Biosystems, Life technologies). The obtained experimental data were statistically analyzed through Excel and SPSS19.0 software, and the differences among different data were compared through t-test. The qRT-PCR reaction system (10 μL) was: 1 μL of cDNA template, 6 μL of SYBR qPCR Mix (TOYOBO), 1 μL of forward primer (10 μmol/L), 1 μL of reverse primer (10 μmol/L), and ddH2O to make up 10 μL. The qRT-PCR amplification procedure was as follows: 95° C. for 30 s; 95° C. for 5 s; 55° C. for 10 s; 72° C. for 15 s, 40 cycles. The required primers are shown in Table 3. The results are shown in FIGS. 5A-5C. The related genes involved in chlorophyll synthesis and chloroplast development showed down-regulated expression in wlp3, indicating that mutations in wlp3 affected chlorophyll synthesis and chloroplast development.

TABLE 3

Primer sequences of real-time fluorescent quantitative PCR

| Primer name | Forward primer (5'-3') | Reverse primer (5'-3') |
|---|---|---|
| qRT-HEMA1 | CGCTATTTCTGATGCTATGGGT (SEQ ID NO: 27) | TCTTGGGTGATGATTGTTTGG (SEQ ID NO: 28) |
| qRT-PORA1 | TGTACTGGAGCTGGAACAACAA (SEQ ID NO: 29) | GAGCACAGCAAAATCCTAGACG (SEQ ID NO: 30) |
| qRT-CAO1 | GATCCATACCCGATCGACAT (SEQ ID NO: 31) | CGAGAGACATCCGGTAGAGC (SEQ ID NO: 32) |
| qRT-YGL1 | AACCTTACCGTCCTATTCCTT (SEQ ID NO: 33) | CCATACATCTAACAGAGCACCC (SEQ ID NO: 34) |
| qRT-V1 | TGGAGGTCGGGACAGAGGA (SEQ ID NO: 35) | CGAGGAGCACCACCATCAC (SEQ ID NO: 36) |
| qRT-V2 | CGACAAGCAGAGCGAAGCG (SEQ ID NO: 37) | AGGTTGCTGCTCCTTGAATGT (SEQ ID NO: 38) |
| qRT-rbcS | TCCGCTGAGTTTTGGCTATTT (SEQ ID NO: 39) | GGACTTGAGCCCTGGAAGG (SEQ ID NO: 40) |
| qRT-rbcL | CTTGGCAGCATTCCGAGTAA (SEQ ID NO: 41) | ACAACGGGCTCGATGTGATA (SEQ ID NO: 42) |

TABLE 3-continued

Primer sequences of real-time fluorescent quantitative PCR

| Primer name | Forward primer (5'-3') | Reverse primer (5'-3') |
|---|---|---|
| qRT-Cab1R | AGATGGGTTTAGTGCGACGAG (SEQ ID NO: 43) | TTTGGGATCGAGGGAGTATTT (SEQ ID NO: 44) |
| qRT-Cab2R | TGTTCTCCATGTTCGGCTTCT (SEQ ID NO: 45) | GCTACGGTCCCCACTTCACT (SEQ ID NO: 46) |
| qRT-psaA | GCGAGCAAATAAAACACCTTTC (SEQ ID NO: 47) | GTACCAGCTTAACGTGGGGAG (SEQ ID NO: 48) |
| qRT-psbA | CCCTCATTAGCAGATTCGTTTT (SEQ ID NO: 49) | ATGATTGTATTCCAGGCAGAGC (SEQ ID NO: 50) |
| qRT-spp | CGGAGAGGAAACATAATGAC (SEQ ID NO: 51) | ATAGGCATTTGTCTTTGTCTC (SEQ ID NO: 52) |
| qRT-OsPPR1 | CTAAGACCGAATGACAAATGC (SEQ ID NO: 53) | GCACTGCCAACAAGAATACC (SEQ ID NO: 54) |
| qRT-OsDVR | CGAGCCCAGGTTCATCAAGGTGC (SEQ ID NO: 55) | CCTCCCGATCTTGCCGAACTCC (SEQ ID NO: 56) |
| qRT-rpoA | GTGGAAGTGTGTTGAATCAA (SEQ ID NO: 57) | TCTCTCTTGATCCGTAACTC (SEQ ID NO: 58) |
| qRT-rpoB | TTTGGTTTCGATGTGCA (SEQ ID NO: 59) | TATGGTCTAATTCCGAGCGGT (SEQ ID NO: 60) |
| qRT-OsRpoTp | AAGCAGACAGTGATGACATC (SEQ ID NO: 61) | ATCACATGCATGCACCCAAA (SEQ ID NO: 62) |
| qRT-rps12 | AGCCGTTTGCTACCAATGG (SEQ ID NO: 63) | TGATCGGTACCAATGAATAGG (SEQ ID NO: 64) |
| qRT-WLP1 | TTGATGACTATTTGAAGGGTTGG (SEQ ID NO: 65) | ACATCAAGACGACCCACAGTAA (SEQ ID NO: 66) |
| qRT-WGL2 | GCCAAGGAGTATTTGCAAGG (SEQ ID NO: 67) | TAACTTTGTTTGCGGTGCTG (SEQ ID NO: 68) |
| qRT-ASL4 | ACTGCTTTCTTGCCTTTGGA (SEQ ID NO: 69) | GAAGCTGTCTGCACCTTTCC (SEQ ID NO: 70) |
| qRT-WLP3 | GGAGAGGCCAAGACTCAGTG (SEQ ID NO: 71) | CAAGCAAGACTTGGCAATCA (SEQ ID NO: 72) |
| qRT-ASL1 | AAGAAAGCTGATGCCACACC (SEQ ID NO: 73) | ACCAACCACGGAGTATCTCG (SEQ ID NO: 74) |
| qRT-ASL2 | CTGCTGTTCATGCAGTGGTT (SEQ ID NO: 75) | CAGGGAAGTCCTCGTATCCA (SEQ ID NO: 76) |
| qRT-AL2 | AGAAGACGGAGTTCGACGTG (SEQ ID NO: 77) | TGACACCCTCCTTGACCTTC (SEQ ID NO: 78) |

Embodiment 7 Transgenic Experiment

Figure 6A:
FIGS. 6A-6B show the functional complementarity diagram of wlp3.
Figure 6B:
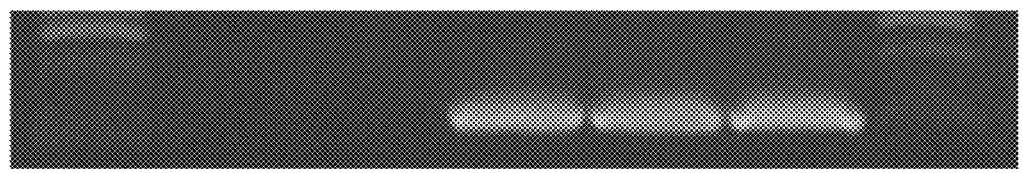

The transgenic experiment was performed on the genes mentioned in SEQ ID NO: 1. The 700 bp promoter upstream of wlp3 and the DNA of entire genome of wlp3 were amplified by the primer pairs respectively for the construction of complementary vectors, and were transferred into the healing tissue of wlp3 by *Agrobacterium*. The obtained result is that a total of 21 transgenic plants were obtained after transformation. Observing the phenotypes, it was found that 2 plants still exhibited an albinism phenotype during the seedling stage, while 19 transgenic plants restored their green phenotype. Through identification, it was found that the 19 transgenic plants were positive and all exhibited normal phenotypes. The genetic complementarity of wlp3 confirmed that LOC_Os03g61260 is the WLP3 gene, and the single base mutation of this gene can lead to the appearance of albinism phenotype in rice seedlings and later turn green (as shown in FIGS. 6A-6B).

The agronomic traits of wild type and wlp3 mutant are compared in Table 4;

TABLE 4

Agronomic traits of wild type and wlp3

| Trait | ZH11 | wlp3 |
|---|---|---|
| Plant height/cm | 106.20 ± 2.17 | 129.73 ± 6.64** |
| Panicle length/cm | 20.32 ± 1.32 | 26.90 ± 1.97** |
| Effective number of panicles | 10.60 ± 3.21 | 8.40 ± 1.52 |
| Flag leaf length/cm | 36.00 ± 8.19 | 26.93 ± 2.54 |
| Primary branch number | 12.00 ± 1.00 | 14.40 ± 1.52* |
| Secondary branch number | 23.80 ± 6.46 | 33.00 ± 2.65* |
| Tiller number | 9.80 ± 2.39 | 9.20 ± 1.30 |
| Filled grain number per panicle | 121.00 ± 23.97 | 150.00 ± 11.00** |
| Seed-setting rate/% | 41.65 ± 1.74 | 48.75 ± 2.20** |
| 1000-grain weight/g | 18.90 ± 0.46 | 15.90 ± 0.78* |

Various embodiments in the present specification are described in a progressive manner, and the emphasizing description of each embodiment is different from the other embodiments. The same and similar parts of various embodiments can be referred to for each other.

The above description of the disclosed embodiments enables those skilled in the art to realize or use the present disclosure. Many modifications to these embodiments will be apparent to those skilled in the art. The general principle defined herein can be realized in other embodiments without departing from the spirit or scope of the present disclosure. Therefore, the present disclosure will not be limited to these embodiments shown herein, but will conform to the widest scope consistent with the principle and novel features disclosed herein.

SEQUENCE LISTING

```
Sequence total quantity: 81
SEQ ID NO: 1               moltype = DNA  length = 513
FEATURE                    Location/Qualifiers
misc_feature               1..513
                           note = The sequence is synthetized.
source                     1..513
                           mol_type = other DNA
                           organism = synthetic construct
SEQUENCE: 1
atgctcgcct cgccggcgct cgccggcgcg cgcgccttcg cggcgaccgt gtccgggagc   60
ctcggcatcc ccattccggc catctccgcg ccctcgccct cgcaggcgcg gcggcgggcc  120
tctctcgtcg tcgttgcaaa ggtcaaggtg tccactcccc aggccgaccg catcgcccgc  180
catgtccgcc tccgcaagaa ggttagtggc accacggaga ggccaagact cagtgttttc  240
cgctcaaaca aacatttata tgctcaagtg attgacgata caaagtcatg cactctggtt  300
tcagcttcca caatgcacaa gtctctttca aaggacttgg aatactcggc agggccaaca  360
gttgaagtgg cacaaaagat cggtgaagtg attgccaagt cttgcttgga gaaaggaatt  420
accaaagttg tttttgaccg gggtggtttc ctctaccatg gtcgcattaa agctctggct  480
gatgctgcta gagagaatgg gcttgatttc tga                              513

SEQ ID NO: 2               moltype = AA  length = 170
FEATURE                    Location/Qualifiers
REGION                     1..170
                           note = The sequence is synthetized.
source                     1..170
                           mol_type = protein
                           organism = synthetic construct
SEQUENCE: 2
MLASPALAGA RAFAATVSGS LGIPIPAISA PSPSQARRRA SLVVVAKVKV STPQADRIAR   60
HVRLRKKVSG TTERPRLSVF RSNKHLYAQV IDDTKSCTLV SASTMHKSLS KDLEYSAGPT  120
VEVAQKTGEV IAKSCLEKGI TKVVFDRGGF LYHGRIKALA DAARENGLDF            170

SEQ ID NO: 3               moltype = DNA  length = 513
FEATURE                    Location/Qualifiers
source                     1..513
                           mol_type = genomic DNA
                           organism = unidentified
SEQUENCE: 3
atgctcgcct cgccggcgct cgccggcgcg cgcgccttcg cggcgaccgt gtccgggagc   60
ctcggcatcc ccattccggc catctccgcg ccctcgccct cgcaggcgcg gcggcgggcc  120
tctctcgtcg tcgttgcaaa ggtcaaggtg tccactcccc aggccgaccg catcgcccgc  180
catgtccgcc tccgcaagaa ggttagtggc accacggaga ggccaagact cagtgttttc  240
cgctcaaaca aacatttata tgctcaagtg attgacgata caaagtcatg cactctggtt  300
tcagcttcca caatgcacaa gtctctttca aaggacttgg aatactcggc agggccaaca  360
gttgaagtgg cacaaaagat tggtgaagtg attgccaagt cttgcttgga gaaaggaatt  420
accaaagttg tttttgaccg gggtggtttc ctctaccatg gtcgcattaa agctctggct  480
gatgctgcta gagagaatgg gcttgatttc tga                              513

SEQ ID NO: 4               moltype = AA  length = 170
FEATURE                    Location/Qualifiers
REGION                     1..170
                           note = The sequence is synthetized.
source                     1..170
                           mol_type = protein
                           organism = synthetic construct
SEQUENCE: 4
MLASPALAGA RAFAATVSGS LGIPIPAISA PSPSQARRRA SLVVVAKVKV STPQADRIAR   60
HVRLRKKVSG TTERPRLSVF RSNKHLYAQV IDDTKSCTLV SASTMHKSLS KDLEYSAGPT  120
VEVAQKIGEV IAKSCLEKGI TKVVFDRGGF LYHGRIKALA DAARENGLDF            170

SEQ ID NO: 5               moltype = DNA  length = 21
FEATURE                    Location/Qualifiers
misc_feature               1..21
                           note = The sequence is synthetized.
source                     1..21
                           mol_type = other DNA
                           organism = synthetic construct
SEQUENCE: 5
gttttgttcc tttgttttct c                                            21

SEQ ID NO: 6               moltype = DNA  length = 23
FEATURE                    Location/Qualifiers
misc_feature               1..23
                           note = The sequence is synthetized.
source                     1..23
                           mol_type = other DNA
                           organism = synthetic construct
SEQUENCE: 6
aatagatgaa gggagtatct cat                                          23
```

-continued

```
SEQ ID NO: 7            moltype = DNA   length = 21
FEATURE                 Location/Qualifiers
misc_feature            1..21
                        note = The sequence is synthetized.
source                  1..21
                        mol_type = other DNA
                        organism = synthetic construct
SEQUENCE: 7
gagttacctc catcctgttg c                                                  21

SEQ ID NO: 8            moltype = DNA   length = 21
FEATURE                 Location/Qualifiers
misc_feature            1..21
                        note = The sequence is synthetized.
source                  1..21
                        mol_type = other DNA
                        organism = synthetic construct
SEQUENCE: 8
agagtcttga tctcgtgctt c                                                  21

SEQ ID NO: 9            moltype = DNA   length = 20
FEATURE                 Location/Qualifiers
misc_feature            1..20
                        note = The sequence is synthetized.
source                  1..20
                        mol_type = other DNA
                        organism = synthetic construct
SEQUENCE: 9
ccagcctagt cagaggcaga                                                    20

SEQ ID NO: 10           moltype = DNA   length = 21
FEATURE                 Location/Qualifiers
misc_feature            1..21
                        note = The sequence is synthetized.
source                  1..21
                        mol_type = other DNA
                        organism = synthetic construct
SEQUENCE: 10
ggtggttttg atcctggttt t                                                  21

SEQ ID NO: 11           moltype = DNA   length = 20
FEATURE                 Location/Qualifiers
misc_feature            1..20
                        note = The sequence is synthetized.
source                  1..20
                        mol_type = other DNA
                        organism = synthetic construct
SEQUENCE: 11
gagctgccat ggtaggatgt                                                    20

SEQ ID NO: 12           moltype = DNA   length = 22
FEATURE                 Location/Qualifiers
misc_feature            1..22
                        note = The sequence is synthetized.
source                  1..22
                        mol_type = other DNA
                        organism = synthetic construct
SEQUENCE: 12
aacggacagc tcgtacattt tt                                                 22

SEQ ID NO: 13           moltype = DNA   length = 20
FEATURE                 Location/Qualifiers
misc_feature            1..20
                        note = The sequence is synthetized.
source                  1..20
                        mol_type = other DNA
                        organism = synthetic construct
SEQUENCE: 13
gtcttccggt tagctccaca                                                    20

SEQ ID NO: 14           moltype = DNA   length = 20
FEATURE                 Location/Qualifiers
misc_feature            1..20
                        note = The sequence is synthetized.
source                  1..20
                        mol_type = other DNA
                        organism = synthetic construct
SEQUENCE: 14
```

```
taattcgcag ccattcaaca                                               20

SEQ ID NO: 15          moltype = DNA   length = 20
FEATURE                Location/Qualifiers
misc_feature           1..20
                       note = The sequence is synthetized.
source                 1..20
                       mol_type = other DNA
                       organism = synthetic construct
SEQUENCE: 15
caatcgcctc tacgtccatt                                               20

SEQ ID NO: 16          moltype = DNA   length = 20
FEATURE                Location/Qualifiers
misc_feature           1..20
                       note = The sequence is synthetized.
source                 1..20
                       mol_type = other DNA
                       organism = synthetic construct
SEQUENCE: 16
gccgggatgt tctggtagta                                               20

SEQ ID NO: 17          moltype = DNA   length = 20
FEATURE                Location/Qualifiers
misc_feature           1..20
                       note = The sequence is synthetized.
source                 1..20
                       mol_type = other DNA
                       organism = synthetic construct
SEQUENCE: 17
ggattgaagc aggtgttcgt                                               20

SEQ ID NO: 18          moltype = DNA   length = 20
FEATURE                Location/Qualifiers
misc_feature           1..20
                       note = The sequence is synthetized.
source                 1..20
                       mol_type = other DNA
                       organism = synthetic construct
SEQUENCE: 18
tgtagtaggt ggggccgtag                                               20

SEQ ID NO: 19          moltype = DNA   length = 20
FEATURE                Location/Qualifiers
misc_feature           1..20
                       note = The sequence is synthetized.
source                 1..20
                       mol_type = other DNA
                       organism = synthetic construct
SEQUENCE: 19
caagacttgg ctgcgttctt                                               20

SEQ ID NO: 20          moltype = DNA   length = 22
FEATURE                Location/Qualifiers
misc_feature           1..22
                       note = The sequence is synthetized.
source                 1..22
                       mol_type = other DNA
                       organism = synthetic construct
SEQUENCE: 20
cagtccggaa ggagtataac ca                                            22

SEQ ID NO: 21          moltype = DNA   length = 20
FEATURE                Location/Qualifiers
misc_feature           1..20
                       note = The sequence is synthetized.
source                 1..20
                       mol_type = other DNA
                       organism = synthetic construct
SEQUENCE: 21
gacttcaatg cggaaaccat                                               20

SEQ ID NO: 22          moltype = DNA   length = 21
FEATURE                Location/Qualifiers
misc_feature           1..21
                       note = The sequence is synthetized.
source                 1..21
                       mol_type = other DNA
                       organism = synthetic construct
```

```
SEQUENCE: 22
ttgcagactc aacctacacc a                                              21

SEQ ID NO: 23           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 23
atctcctcgt ggacataggc                                                20

SEQ ID NO: 24           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 24
atgccacatg cataaaacca                                                20

SEQ ID NO: 25           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 25
ctgacgatcc tttgctgatg                                                20

SEQ ID NO: 26           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 26
aaatgctccc agcttttcct                                                20

SEQ ID NO: 27           moltype = DNA  length = 22
FEATURE                 Location/Qualifiers
misc_feature            1..22
                        note = The sequence is synthetized.
source                  1..22
                        mol_type = other DNA
                        organism = synthetic construct
SEQUENCE: 27
cgctatttct gatgctatgg gt                                             22

SEQ ID NO: 28           moltype = DNA  length = 21
FEATURE                 Location/Qualifiers
misc_feature            1..21
                        note = The sequence is synthetized.
source                  1..21
                        mol_type = other DNA
                        organism = synthetic construct
SEQUENCE: 28
tcttgggtga tgattgtttg g                                              21

SEQ ID NO: 29           moltype = DNA  length = 22
FEATURE                 Location/Qualifiers
misc_feature            1..22
                        note = The sequence is synthetized.
source                  1..22
                        mol_type = other DNA
                        organism = synthetic construct
SEQUENCE: 29
tgtactggag ctggaacaac aa                                             22

SEQ ID NO: 30           moltype = DNA  length = 22
FEATURE                 Location/Qualifiers
misc_feature            1..22
                        note = The sequence is synthetized.
source                  1..22
                        mol_type = other DNA
```

```
                        organism = synthetic construct
SEQUENCE: 30
gagcacagca aaatcctaga cg                                                          22

SEQ ID NO: 31           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 31
gatccatacc cgatcgacat                                                             20

SEQ ID NO: 32           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 32
cgagagacat ccggtagagc                                                             20

SEQ ID NO: 33           moltype = DNA  length = 21
FEATURE                 Location/Qualifiers
misc_feature            1..21
                        note = The sequence is synthetized.
source                  1..21
                        mol_type = other DNA
                        organism = synthetic construct
SEQUENCE: 33
aaccttaccg tcctattcct t                                                           21

SEQ ID NO: 34           moltype = DNA  length = 22
FEATURE                 Location/Qualifiers
misc_feature            1..22
                        note = The sequence is synthetized.
source                  1..22
                        mol_type = other DNA
                        organism = synthetic construct
SEQUENCE: 34
ccatacatct aacagagcac cc                                                          22

SEQ ID NO: 35           moltype = DNA  length = 19
FEATURE                 Location/Qualifiers
misc_feature            1..19
                        note = The sequence is synthetized.
source                  1..19
                        mol_type = other DNA
                        organism = synthetic construct
SEQUENCE: 35
tggaggtcgg gacagagga                                                              19

SEQ ID NO: 36           moltype = DNA  length = 19
FEATURE                 Location/Qualifiers
misc_feature            1..19
                        note = The sequence is synthetized.
source                  1..19
                        mol_type = other DNA
                        organism = synthetic construct
SEQUENCE: 36
cgaggagcac caccatcac                                                              19

SEQ ID NO: 37           moltype = DNA  length = 19
FEATURE                 Location/Qualifiers
misc_feature            1..19
                        note = The sequence is synthetized.
source                  1..19
                        mol_type = other DNA
                        organism = synthetic construct
SEQUENCE: 37
cgacaagcag agcgaagcg                                                              19

SEQ ID NO: 38           moltype = DNA  length = 21
FEATURE                 Location/Qualifiers
misc_feature            1..21
                        note = The sequence is synthetized.
source                  1..21
```

```
                        mol_type = other DNA
                        organism = synthetic construct
SEQUENCE: 38
aggttgctgc tccttgaatg t                                              21

SEQ ID NO: 39           moltype = DNA   length = 21
FEATURE                 Location/Qualifiers
misc_feature            1..21
                        note = The sequence is synthetized.
source                  1..21
                        mol_type = other DNA
                        organism = synthetic construct
SEQUENCE: 39
tccgctgagt tttggctatt t                                              21

SEQ ID NO: 40           moltype = DNA   length = 19
FEATURE                 Location/Qualifiers
misc_feature            1..19
                        note = The sequence is synthetized.
source                  1..19
                        mol_type = other DNA
                        organism = synthetic construct
SEQUENCE: 40
ggacttgagc cctggaagg                                                 19

SEQ ID NO: 41           moltype = DNA   length = 20
FEATURE                 Location/Qualifiers
misc_feature            1..20
                        note = The sequence is synthetized.
source                  1..20
                        mol_type = other DNA
                        organism = synthetic construct
SEQUENCE: 41
cttggcagca ttccgagtaa                                                20

SEQ ID NO: 42           moltype = DNA   length = 20
FEATURE                 Location/Qualifiers
misc_feature            1..20
                        note = The sequence is synthetized.
source                  1..20
                        mol_type = other DNA
                        organism = synthetic construct
SEQUENCE: 42
acaacgggct cgatgtgata                                                20

SEQ ID NO: 43           moltype = DNA   length = 21
FEATURE                 Location/Qualifiers
misc_feature            1..21
                        note = The sequence is synthetized.
source                  1..21
                        mol_type = other DNA
                        organism = synthetic construct
SEQUENCE: 43
agatgggttt agtgcgacga g                                              21

SEQ ID NO: 44           moltype = DNA   length = 21
FEATURE                 Location/Qualifiers
misc_feature            1..21
                        note = The sequence is synthetized.
source                  1..21
                        mol_type = other DNA
                        organism = synthetic construct
SEQUENCE: 44
tttgggatcg agggagtatt t                                              21

SEQ ID NO: 45           moltype = DNA   length = 21
FEATURE                 Location/Qualifiers
misc_feature            1..21
                        note = The sequence is synthetized.
source                  1..21
                        mol_type = other DNA
                        organism = synthetic construct
SEQUENCE: 45
tgttctccat gttcggcttc t                                              21

SEQ ID NO: 46           moltype = DNA   length = 20
FEATURE                 Location/Qualifiers
misc_feature            1..20
                        note = The sequence is synthetized.
```

```
source                      1..20
                            mol_type = other DNA
                            organism = synthetic construct
SEQUENCE: 46
gctacggtcc ccacttcact                                                     20

SEQ ID NO: 47               moltype = DNA   length = 22
FEATURE                     Location/Qualifiers
misc_feature                1..22
                            note = The sequence is synthetized.
source                      1..22
                            mol_type = other DNA
                            organism = synthetic construct
SEQUENCE: 47
gcgagcaaat aaaacacctt tc                                                  22

SEQ ID NO: 48               moltype = DNA   length = 21
FEATURE                     Location/Qualifiers
misc_feature                1..21
                            note = The sequence is synthetized.
source                      1..21
                            mol_type = other DNA
                            organism = synthetic construct
SEQUENCE: 48
gtaccagctt aacgtgggga g                                                   21

SEQ ID NO: 49               moltype = DNA   length = 22
FEATURE                     Location/Qualifiers
misc_feature                1..22
                            note = The sequence is synthetized.
source                      1..22
                            mol_type = other DNA
                            organism = synthetic construct
SEQUENCE: 49
ccctcattag cagattcgtt tt                                                  22

SEQ ID NO: 50               moltype = DNA   length = 22
FEATURE                     Location/Qualifiers
misc_feature                1..22
                            note = The sequence is synthetized.
source                      1..22
                            mol_type = other DNA
                            organism = synthetic construct
SEQUENCE: 50
atgattgtat tccaggcaga gc                                                  22

SEQ ID NO: 51               moltype = DNA   length = 20
FEATURE                     Location/Qualifiers
misc_feature                1..20
                            note = The sequence is synthetized.
source                      1..20
                            mol_type = other DNA
                            organism = synthetic construct
SEQUENCE: 51
cggagaggaa acataatgac                                                     20

SEQ ID NO: 52               moltype = DNA   length = 21
FEATURE                     Location/Qualifiers
misc_feature                1..21
                            note = The sequence is synthetized.
source                      1..21
                            mol_type = other DNA
                            organism = synthetic construct
SEQUENCE: 52
ataggcattt gtctttgtct c                                                   21

SEQ ID NO: 53               moltype = DNA   length = 21
FEATURE                     Location/Qualifiers
misc_feature                1..21
                            note = The sequence is synthetized.
source                      1..21
                            mol_type = other DNA
                            organism = synthetic construct
SEQUENCE: 53
ctaagaccga atgacaaatg c                                                   21

SEQ ID NO: 54               moltype = DNA   length = 20
FEATURE                     Location/Qualifiers
misc_feature                1..20
```

```
                    note = The sequence is synthetized.
source              1..20
                    mol_type = other DNA
                    organism = synthetic construct
SEQUENCE: 54
gcactgccaa caagaatacc                                               20

SEQ ID NO: 55       moltype = DNA  length = 23
FEATURE             Location/Qualifiers
misc_feature        1..23
                    note = The sequence is synthetized.
source              1..23
                    mol_type = other DNA
                    organism = synthetic construct
SEQUENCE: 55
cgagcccagg ttcatcaagg tgc                                           23

SEQ ID NO: 56       moltype = DNA  length = 22
FEATURE             Location/Qualifiers
misc_feature        1..22
                    note = The sequence is synthetized.
source              1..22
                    mol_type = other DNA
                    organism = synthetic construct
SEQUENCE: 56
cctcccgatc ttgccgaact cc                                            22

SEQ ID NO: 57       moltype = DNA  length = 20
FEATURE             Location/Qualifiers
misc_feature        1..20
                    note = The sequence is synthetized.
source              1..20
                    mol_type = other DNA
                    organism = synthetic construct
SEQUENCE: 57
gtggaagtgt gttgaatcaa                                               20

SEQ ID NO: 58       moltype = DNA  length = 20
FEATURE             Location/Qualifiers
misc_feature        1..20
                    note = The sequence is synthetized.
source              1..20
                    mol_type = other DNA
                    organism = synthetic construct
SEQUENCE: 58
tctctcttga tccgtaactc                                               20

SEQ ID NO: 59       moltype = DNA  length = 17
FEATURE             Location/Qualifiers
misc_feature        1..17
                    note = The sequence is synthetized.
source              1..17
                    mol_type = other DNA
                    organism = synthetic construct
SEQUENCE: 59
tttggtttcg atgtgca                                                  17

SEQ ID NO: 60       moltype = DNA  length = 21
FEATURE             Location/Qualifiers
misc_feature        1..21
                    note = The sequence is synthetized.
source              1..21
                    mol_type = other DNA
                    organism = synthetic construct
SEQUENCE: 60
tatggtctaa ttccgagcgg t                                             21

SEQ ID NO: 61       moltype = DNA  length = 20
FEATURE             Location/Qualifiers
misc_feature        1..20
                    note = The sequence is synthetized.
source              1..20
                    mol_type = other DNA
                    organism = synthetic construct
SEQUENCE: 61
aagcagacag tgatgacatc                                               20

SEQ ID NO: 62       moltype = DNA  length = 20
FEATURE             Location/Qualifiers
```

```
misc_feature          1..20
                      note = The sequence is synthetized.
source                1..20
                      mol_type = other DNA
                      organism = synthetic construct
SEQUENCE: 62
atcacatgca tgcacccaaa                                              20

SEQ ID NO: 63         moltype = DNA  length = 19
FEATURE               Location/Qualifiers
misc_feature          1..19
                      note = The sequence is synthetized.
source                1..19
                      mol_type = other DNA
                      organism = synthetic construct
SEQUENCE: 63
agccgtttgc taccaatgg                                               19

SEQ ID NO: 64         moltype = DNA  length = 21
FEATURE               Location/Qualifiers
misc_feature          1..21
                      note = The sequence is synthetized.
source                1..21
                      mol_type = other DNA
                      organism = synthetic construct
SEQUENCE: 64
tgatcggtac caatgaatag g                                            21

SEQ ID NO: 65         moltype = DNA  length = 23
FEATURE               Location/Qualifiers
misc_feature          1..23
                      note = The sequence is synthetized.
source                1..23
                      mol_type = other DNA
                      organism = synthetic construct
SEQUENCE: 65
ttgatgacta tttgaagggt tgg                                          23

SEQ ID NO: 66         moltype = DNA  length = 22
FEATURE               Location/Qualifiers
misc_feature          1..22
                      note = The sequence is synthetized.
source                1..22
                      mol_type = other DNA
                      organism = synthetic construct
SEQUENCE: 66
acatcaagac gacccacagt aa                                           22

SEQ ID NO: 67         moltype = DNA  length = 20
FEATURE               Location/Qualifiers
misc_feature          1..20
                      note = The sequence is synthetized.
source                1..20
                      mol_type = other DNA
                      organism = synthetic construct
SEQUENCE: 67
gccaaggagt atttgcaagg                                              20

SEQ ID NO: 68         moltype = DNA  length = 20
FEATURE               Location/Qualifiers
misc_feature          1..20
                      note = The sequence is synthetized.
source                1..20
                      mol_type = other DNA
                      organism = synthetic construct
SEQUENCE: 68
taactttgtt tgcggtgctg                                              20

SEQ ID NO: 69         moltype = DNA  length = 20
FEATURE               Location/Qualifiers
misc_feature          1..20
                      note = The sequence is synthetized.
source                1..20
                      mol_type = other DNA
                      organism = synthetic construct
SEQUENCE: 69
actgctttct tgcctttgga                                              20

SEQ ID NO: 70         moltype = DNA  length = 20
```

```
FEATURE                 Location/Qualifiers
misc_feature            1..20
                        note = The sequence is synthetized.
source                  1..20
                        mol_type = other DNA
                        organism = synthetic construct
SEQUENCE: 70
gaagctgtct gcacctttcc                                               20

SEQ ID NO: 71           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 71
ggagaggcca agactcagtg                                               20

SEQ ID NO: 72           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 72
caagcaagac ttggcaatca                                               20

SEQ ID NO: 73           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 73
aagaaagctg atgccacacc                                               20

SEQ ID NO: 74           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 74
accaaccacg gagtatctcg                                               20

SEQ ID NO: 75           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 75
ctgctgttca tgcagtggtt                                               20

SEQ ID NO: 76           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 76
cagggaagtc ctcgtatcca                                               20

SEQ ID NO: 77           moltype = DNA  length = 20
FEATURE                 Location/Qualifiers
misc_feature            1..20
                        note = The sequence is synthetized.
source                  1..20
                        mol_type = other DNA
                        organism = synthetic construct
SEQUENCE: 77
agaagacgga gttcgacgtg                                               20
```

```
SEQ ID NO: 78          moltype = DNA   length = 20
FEATURE                Location/Qualifiers
misc_feature           1..20
                       note = The sequence is synthetized.
source                 1..20
                       mol_type = other DNA
                       organism = synthetic construct
SEQUENCE: 78
tgacaccctc cttgaccttc                                              20

SEQ ID NO: 79          moltype = DNA   length = 23
FEATURE                Location/Qualifiers
source                 1..23
                       mol_type = other DNA
                       organism = unidentified
SEQUENCE: 79
gcacaaaaga ttggtgaagt gat                                          23

SEQ ID NO: 80          moltype = AA    length = 6
FEATURE                Location/Qualifiers
source                 1..6
                       mol_type = protein
                       organism = synthetic construct
SEQUENCE: 80
QKIGEV                                                              6

SEQ ID NO: 81          moltype = AA    length = 6
FEATURE                Location/Qualifiers
source                 1..6
                       mol_type = protein
                       organism = synthetic construct
SEQUENCE: 81
QKTGEV                                                              6
```

What is claimed is:

1. A method of expressing cold tolerance genes of rice plants comprising the step of mutating a rice white leaf and panicle gene WLP3, wherein the mutation results in a single base substitution in SEQ ID NO: 3 where nucleotide T at position 380 is changed to C, and the encoded protein has the amino acid sequence of SEQ ID NO: 2, and treating the rice plants to a temperature of 4° C. for 7 days; wherein the rice plants are *japonica* rice variety Zhonghua 11 (ZH11); and wherein expression levels of genes DREB1A, DREB1B, and DREB2B are increased in the rice plants compared to expression levels of DREB1A, DREB1B, and DREB2B in wild type ZH11 rice plants treated to a temperature of 4° C. for 7 days.

* * * * *